United States Patent [19]

Kao

[11] Patent Number: 5,419,573

[45] Date of Patent: May 30, 1995

[54] FOLDING BICYCLE

[76] Inventor: Fu-Hsiung Kao, No. 230. Sec. 2, Chang Nan Rd., Chang Hua City, Chang Hua Hsien, Taiwan, Prov. of China

[21] Appl. No.: 224,980

[22] Filed: Apr. 8, 1994

[51] Int. Cl.⁶ .............................................. B62K 15/00
[52] U.S. Cl. .................................... 280/278; 280/287; 74/551.3
[58] Field of Search ............... 280/278, 279, 280, 287; 74/551.1, 551.2, 551.3

[56] References Cited

U.S. PATENT DOCUMENTS

| | | | |
|---|---|---|---|
| 1,584,568 | 5/1926 | Clark | 280/278 |
| 4,182,522 | 1/1980 | Ritchie | 280/278 |
| 4,410,197 | 10/1983 | St. Hillaire | 74/551.1 X |
| 4,417,745 | 11/1983 | Shomo | 280/287 |
| 4,579,360 | 4/1986 | Nishimura et al. | 280/278 |

FOREIGN PATENT DOCUMENTS 0912868  8/1946  France ........................ 74/551.3

Primary Examiner—Margaret A. Focarino
Assistant Examiner—Victor E. Johnson
Attorney, Agent, or Firm—Browdy and Neimark

[57] ABSTRACT

A controlling mechanism for folding mechanism includes a front frame member and a rear frame member. A coupling mechanism generally includes a coupling tube which forms also a part of the front frame member and a coupling shaft which forms also a part of the rear frame member. The coupling tube can be rotatably and slidably mounted to the coupling shaft to facilitate an easy folding of the front frame member with respect to the rear frame member.

2 Claims, 8 Drawing Sheets

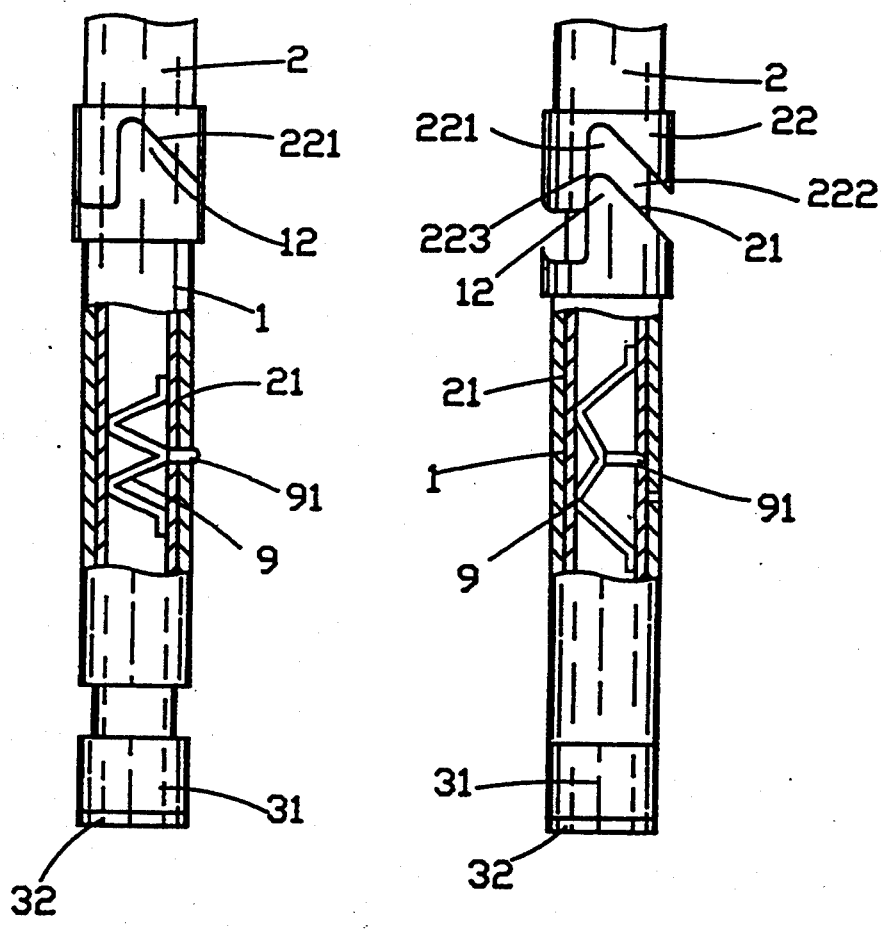

FOLDING BICYCLE

BACKGROUND OF THE INVENTION

1. TECHNICAL FIELD

The present invention relates to an apparatus for a folding bicycle which facilitates a simple configuration, lowers manufacturing costs and is easy to operate.

2. PRIOR ART

The invention of the bicycle can be traced to the Chinese ancient time. According to legend, the bicycle was first invented by Chu-Ger-Liang, accordingly, the bicycle is called Kun-Min Vehicle.

In some areas and in the past where motorcycles and cars are not very popular, the bicycle is the primary means of transportation. As the motorcycle and vehicles and other means of transportation have become more and more popular, the bicycle is used less for transportation and more for sporting events. People generally use the bicycle for short trips.

In the modern city, an apartment for a family or an individual is rather small. Hence, there is little room for storing a bicycle in one's house. Further, it is not convenient for people who live on the top floors to take a bicycle up and down everyday. If one leaves his bicycle outside, he must face the risk of it being stolen.

To solve the problem encountered by conventional bicycles, folding bicycles have been developed which can be fully extended to function as a normal bicycle and which also can be folded to a compact size for easy storage. These prior art folding bicycles have to some extent solved the problem that conventional bicycles encounter. But the connecting mechanism used in the folding bicycle is quite complicated which makes the manufacturing cost high. Further, the operation of such controlling mechanism is also quite difficult and inconvenient. In addition, the stem of the handlebar of a conventional bicycle, folding or not folding, is fixed to the fork tube. Thus, the height of the handlebar is not adjustable for different users.

SUMMARY OF THE INVENTION

It is the object of this invention to provide an improved apparatus for a folding bicycle wherein the configuration is simple and the operation is convenient.

It is still the object of this invention to provide an improved apparatus for a folding bicycle wherein a telescopic mechanism is disposed between the stem and a fork member to facilitate an adjustment of the height of the handlebar.

In order to achieve the objects set forth, the controlling mechanism made according to this invention includes a frame member which is combined by a first or front frame member and second or rear frame member. A coupling mechanism is provided at the second or rear frame in such a manner that the first or front frame member can be pivotedly disposed thereof. By the actuation of the coupling mechanism, the first frame member can be folded onto the second frame member for easy storage or to fully extend from a retracted position to a position for use by a rider.

According to one aspect of the controlling mechanism made according to this invention, a retaining means is disposed at the controlling mechanism for fixing the first frame member and the second frame member from rotating with respect to each other.

According to another aspect of the controlling mechanism made according to this invention, the telescopic mechanism is disposed at the stem of the handlebar for height adjustment. By this arrangement, the handlebar can be easily adjusted to various heights.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a controlling mechanism for a foldable bicycle. In the drawings:

FIG. 2 is a side elevational view of the controlling mechanism wherein the front frame member and the rear frame member are completely connected by the coupling mechanism;

FIG. 3 is still a side elevational view of the controlling mechanism wherein the coupling mechanism is partially separated;

DETAILED DESCRIPTION OF A PREFERABLE EMBODIMENT

Figure 4:
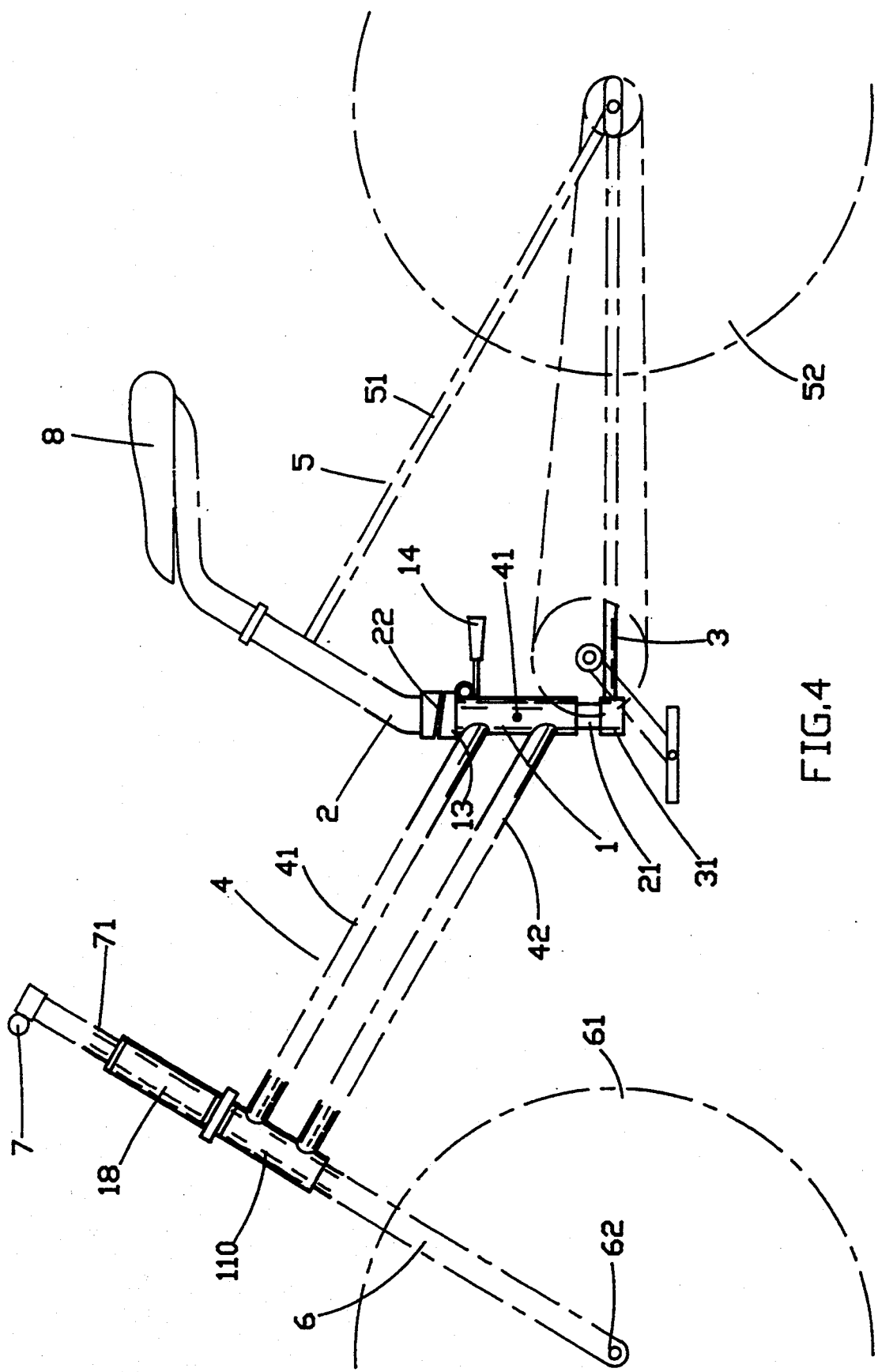
FIG. 4 is an elevation view of a bicycle incorporated with a controlling mechanism made according to this invention, wherein the front frame member and the rear front member are fully extended.

As shown in FIG. 4, the frame member of the bicycle is separated into a first or front frame member 4 and a second or rear frame member 5. The front frame member 4 and the rear frame member 5 are configured in such a manner that frame members 4 and 5 are easily folded together to minimize the bulk size.

The front frame member 4 generally includes a coupling tube 1 and a head tube 110 and a pair of parallel supporting tubes 42, 41 bridging the coupling tube 1 and the head tube 110. A front fork member 6 can be rotatably installed with said head tube 110 and connected to a stem 71 of a handlebar 7. A front wheel 61 is installed to the fork tip 62 of the fork member 6.

The rear frame member 5 generally includes a coupling shaft 21, a seat post 2, a horizontal supporting tube 3 and a inclined supporting tube 51. A seat 8 is installed to the seat post 2. A rear wheel 52 is installed to the rear frame member 5.

Figure 1:
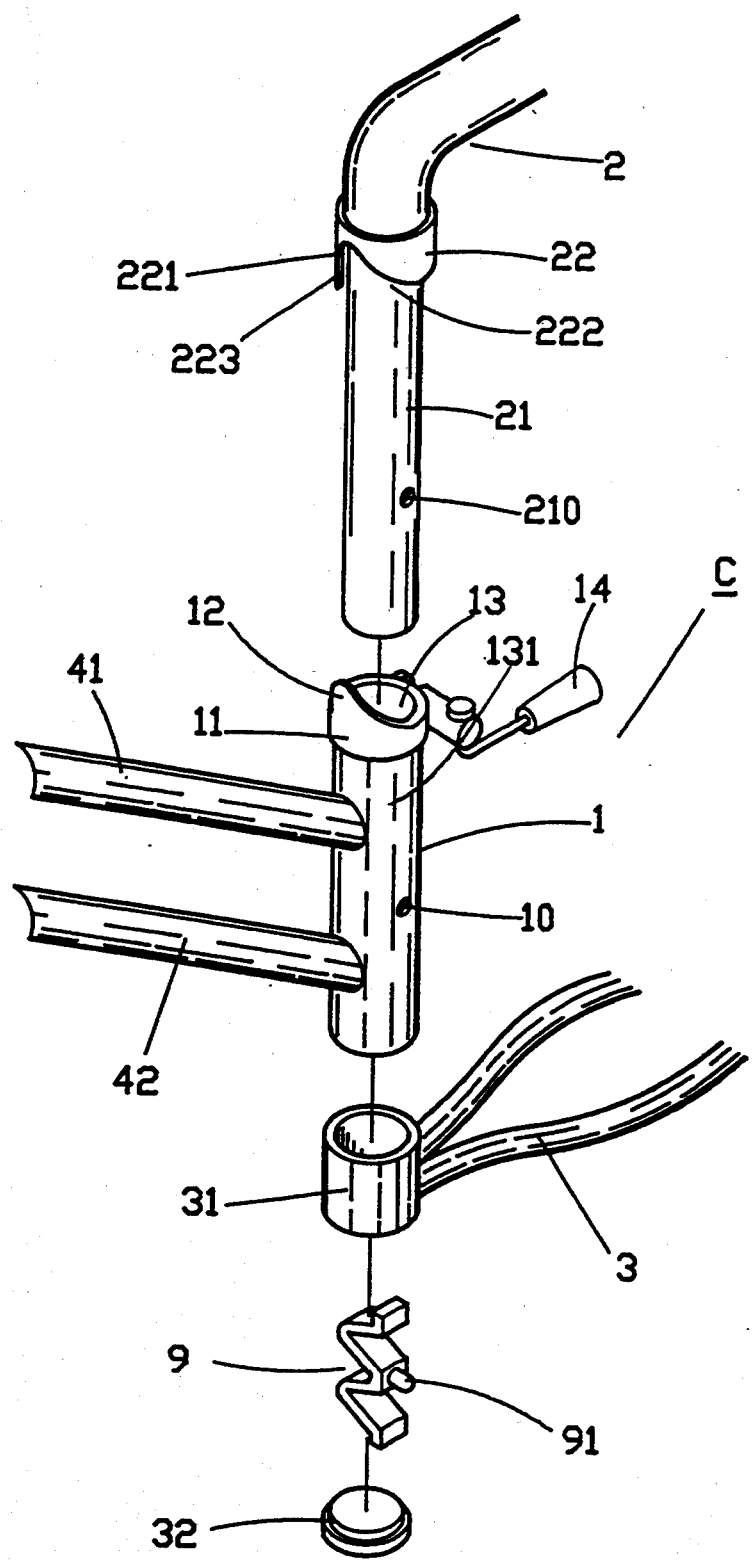
FIG. 1 is an exploded perspective view showing the controlling mechanism of the front and the rear frame member.

As shown in FIG. 1, the coupling mechanism C generally includes the coupling tube 1 which forms a part of the front frame member 4 and a coupling shaft 21 which forms a part of the rear frame member 5. As shown the coupling tube 1 can be rotatably mounted to the coupling shaft 21.

FIG. 1 further discloses a detailed description of the coupling mechanism C. The coupling tube 1 defines a upper end, a lower end and a outer wall. A through hole 10 is provided at the outer wall of the coupling tube 1. The axis of the hole 10 is perpendicular to the plane defined by the front frame member 4. A flange member 11 is provided at the upper end of the coupling tube 1. A contoured portion 12 is provided at the flange member 11 and a sloped portion 13 is formed adjacent to the contoured portion 12. The coupling tube 1 further includes a slit 131 at the upper end. A pair of lug members with threaded hole are disposed at both sides of the slit 131. An adjusting handle 14 is mounted on the lug member for controlling the inner diameter of the coupling tube 1 at the upper end.

The coupling shaft 21 is extended from the seat tube 2 and defines an upper end, a lower end and an outer wall portion. The outer diameter of the coupling shaft 21 is smaller than the inner diameter of the coupling tube 1 in such a manner that the coupling tube 1 can slide onto the coupling shaft 21. A positioning hole 210 is provided at the outer wall of the coupling shaft 21 which corresponds to the through hole 10 of the coupling tube 1 when the bicycle is fully unfolded. A collar 22 is disposed at the upper end of the coupling shaft 21. The collar 22 has contoured recess portion 221 which defines a vertical stopper 223 and a sloped receiving portion 222. The contour portion 12 of the flange member 11 can be completely and compactly received within the contoured recess portion 221 so that the sloped portions 222 and 13 are meshed completely.

The total length of the coupling shaft 21 is longer that the total length of the coupling tube 1. By this arrangement, the coupling tube 1 can be rotated and slided over the coupling shaft 21 to permit movement between a folded position and an unfolded position.

The coupling socket 31 is provided at the end of the horizontal supporting tube 3 of rear frame member 5 for receiving and retaining the lower end of the coupling shaft 21 therein.

As shown in FIGS. 1-3 a biasing spring member 9 having a W-shape is disposed within the coupling tube 21. The biasing spring member 9 further includes a boss 91 which can pass through the positioning hole 210 and the through hole 10 to position the coupling tube 1 and the coupling shaft 21 with each other when the contour portion 12 of the flange member 13 are completely and compactly received by the contoured recess portion 221.

A lid 32 is provided to cover the lower end of the coupling socket 31 to prevent the dust or water enter the coupling shaft 21.

In assembling, the biasing spring member 9 is firstly disposed within the coupling shaft 21 in such a manner that the boss 91 projects from the positioning hole 210. When adjusting handle 14 is loosened the coupling tube 1 can be easily slid onto the coupling shaft 21. Further, the contoured portion 12 and the sloped portion 13 can be completely meshed with the contoured recess portion 221 and the sloped portion 222. The coupling socket 31 is then attached to the lower end of the coupling shaft 21 to retain the coupling tube 1 from being removed therefrom. Last, the lid 42 is attached to the lower end of the coupling socket 31 to complete the assembly.

After the boss 41 projects into the through hole 10, and the contoured portion 12 and the sloped portion 13 are completely meshed with the contoured recess portion 221 and the sloped portion 222 as well, the handle 14 is tightened to lock the coupling tube 1 to the coupling shaft 21. As shown in FIG. 4, this results in the front frame member 4 being positioned in the same plane as the rear frame member 5 so that a complete frame member is ready for normal riding.

As shown in FIGS. 2 and 4, when the contoured portion 12 and the sloped portion 13 are completely meshed with the contoured recess portion 221 and the sloped portion 222, front frame 4 and rear frame 5 are aligned in the same plane. Thus, the front frame member 4 is unfolded from the rear frame member 5. Thereafter, the handle 14 can be tightened to lock coupling tube 1 with respect to the coupling shaft 21.

Figure 5:
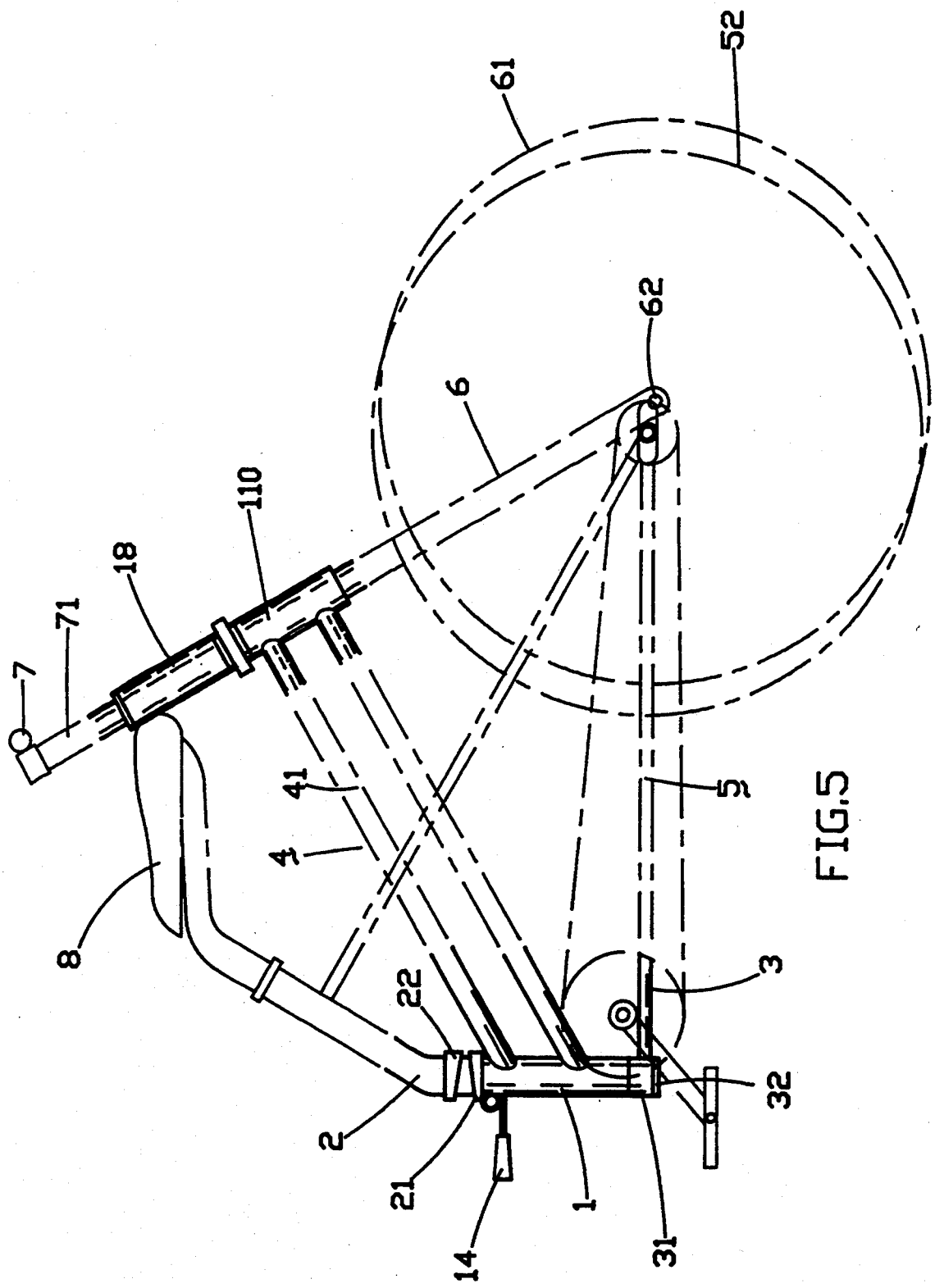
FIG. 5 is an elevation view of a bicycle incorporated with a controlling mechanism made according to this invention, wherein the front frame member and the rear front member are fully folded against each other.
Figure 6:
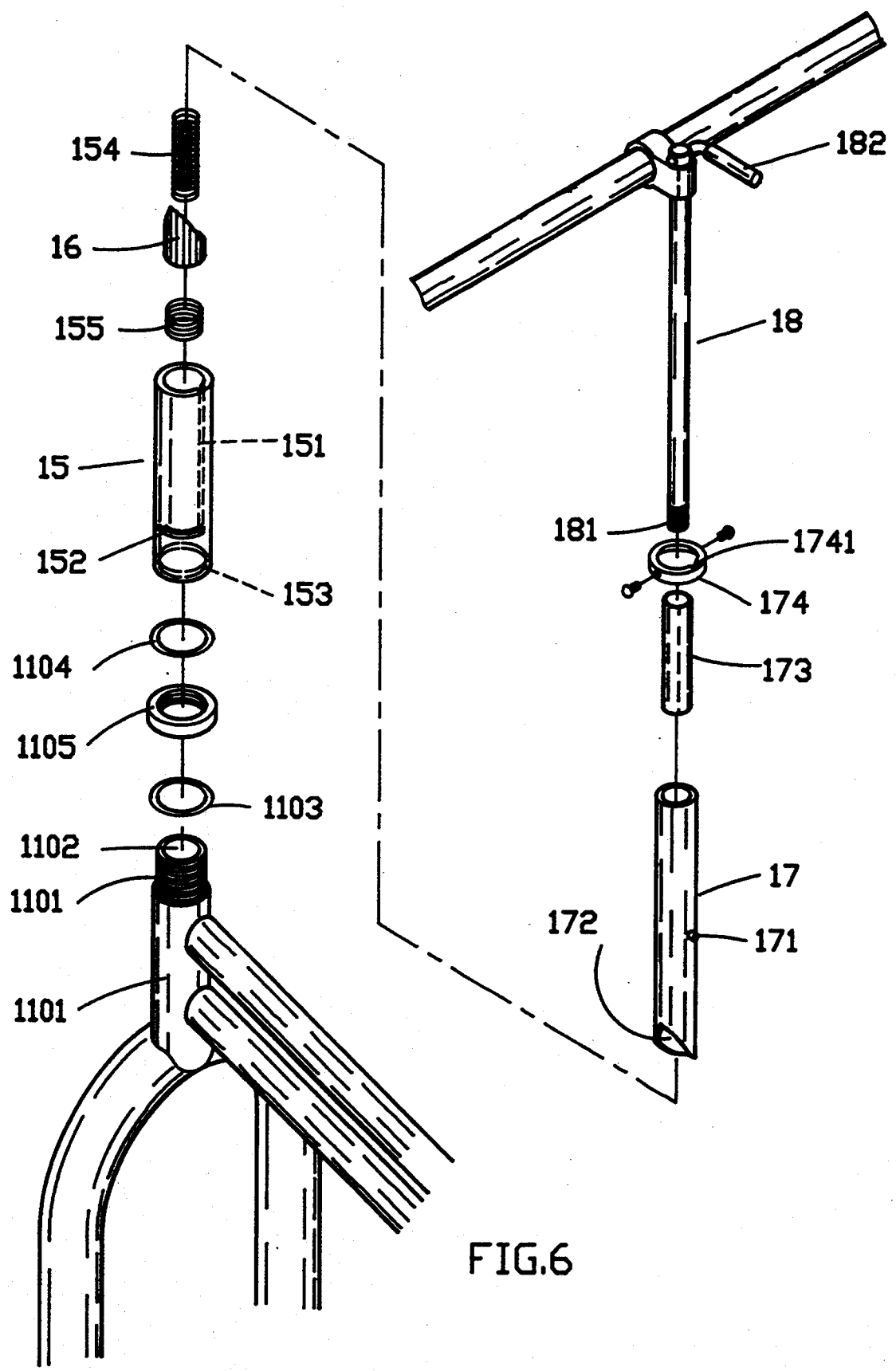
FIG. 6 is a perspective exploded view of a telescopic mechanism to be incorporated with the stem of the handlebar.

As shown in FIGS. 3 and 5, when the contoured portion 12 and the sloped portion 13 are completely released from the contoured recess portion 221 and the sloped portion 222 shaft 21 and tube 1 can rotate relative to each other. This permits folding of the front frame member 4 relative to the rear frame member 5 as shown in FIG. 5. Again, the handle 14 can be tightened to lock coupling tube 1 with respect to the coupling shaft 21 when the front frame member 4 is completely folded onto the rear frame member 5 to hold the folded frames in that position.

Figure 7:
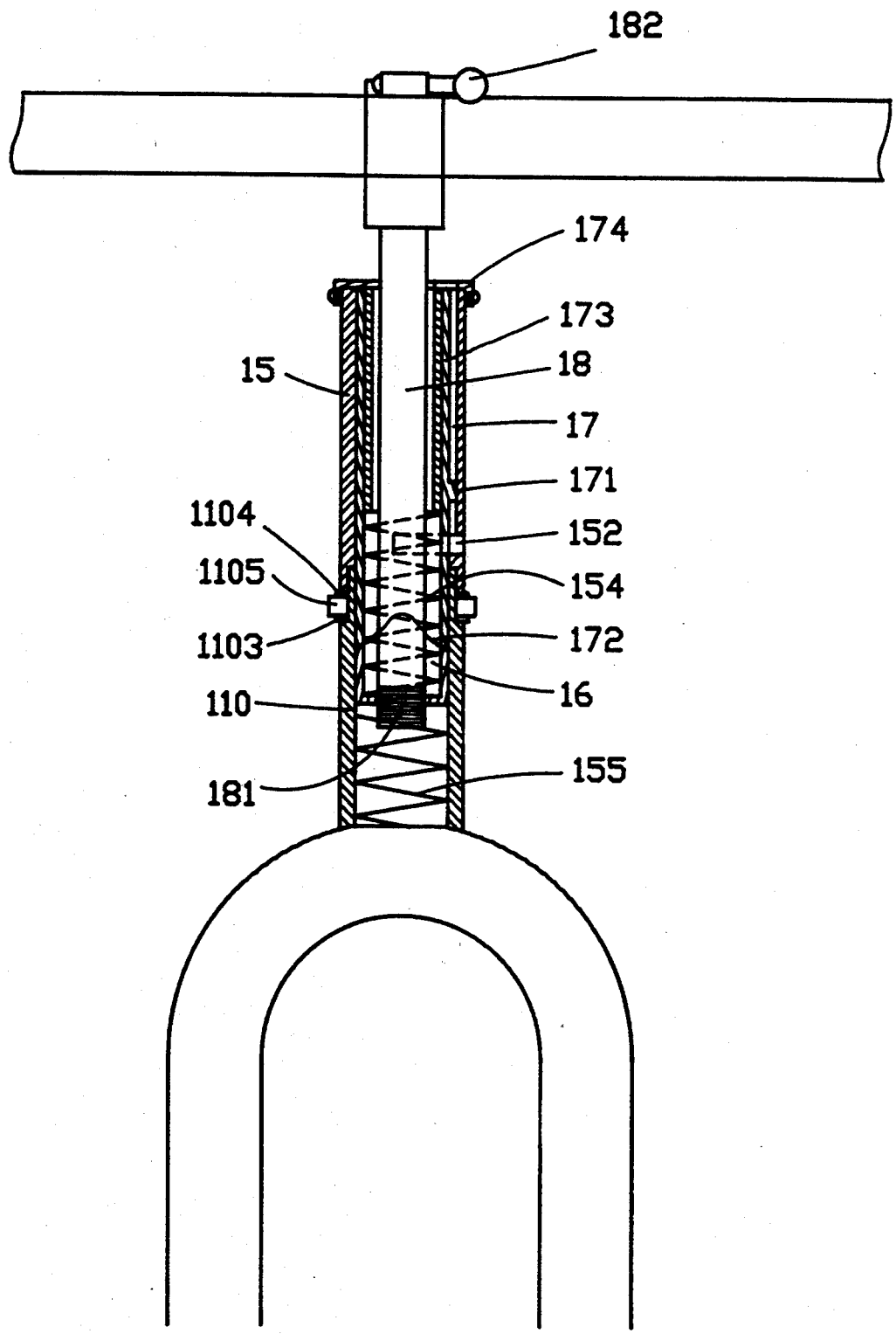
FIG. 7 is a cross sectional view of the telescopic mechanism of FIG. 6 incorporated with the stem of the handlebar.
Figure 8:
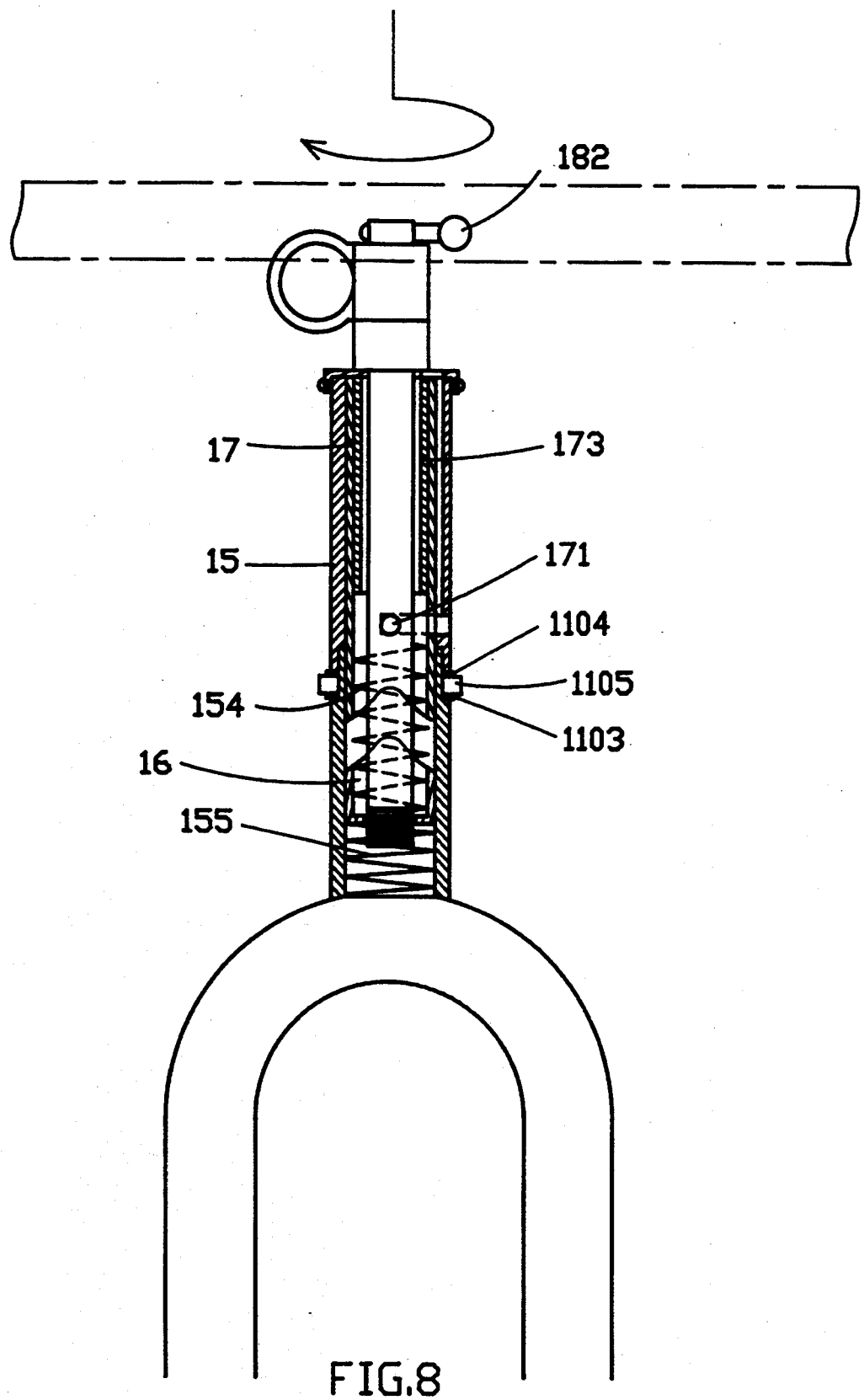
FIG. 8 is an elevation view similar to FIG. 7 wherein the stem is moved to a lower position.
Figure 9:
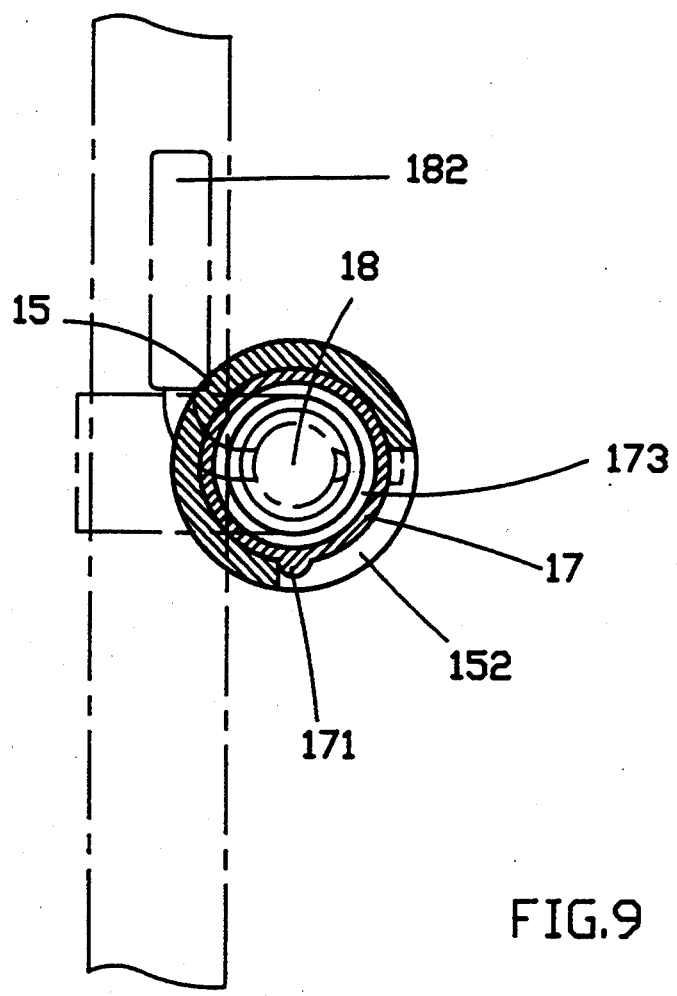
FIG. 9 is an end view of the telescopic mechanism incorporated with the stem.
Figure 10:
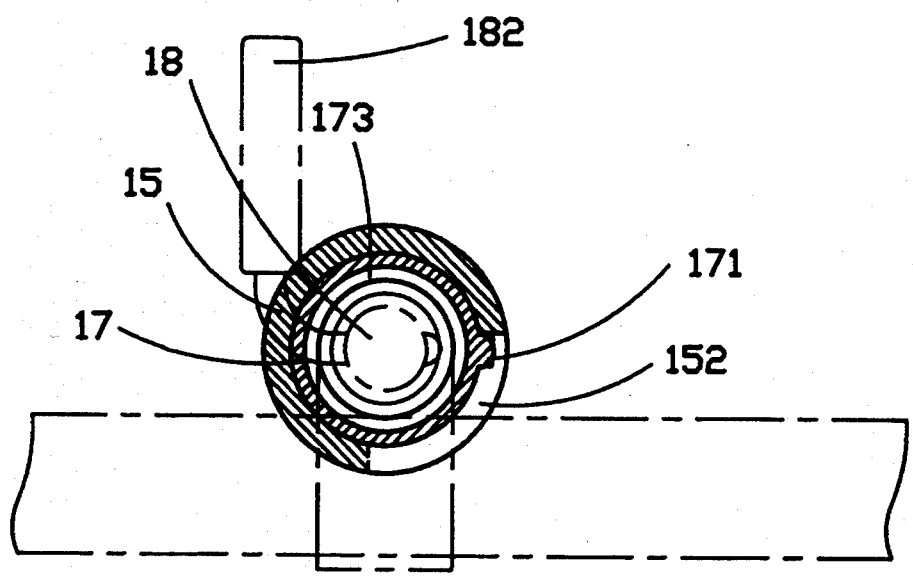
FIG. 10 is an end view of the telescopic mechanism of FIG. 9 wherein the mechanism has been moved to a second position.

A preferred embodiment of the telescopic mechanism made according to this invention is shown in FIGS. 6-10. The head tube 110 having a hollow central portion 1102 is provided with a threaded portion 1101 at the top portion. A washer 1103, a collar 1105 and a washer 1104 can be mounted to the threaded portion 1101. By this arrangement, the tube 15 having a inner threaded portion 153 can be screwed to the head tube 110 by the engagement of the threaded portions 1101 and 153. A vertical slot 151 and a horizontal slot 152 adjacent to the vertical slot 151 is provided at the inner wall of the tube 15. A lower compressed spring 155, a retaining body 16 having a projected portion 161 and a upper compressed spring 154 are inserted into the hollow portion defined by the head tube 1101 and the tube 15. An inner tube 17 having a project post 171 with respect to the vertical slot 151 and horizontal slot 152 is inserted into the space defined by the hollow portion defined by the head tube 1101 and the tube 15. The inner tube 17 further includes an acute end 172 which corresponds to the projected portion 161 of the retaining body 16. A central rod 18 having a threaded lower end portion 181 is inserted into the inner tube 17 and then engages with a threaded portion of the retaining body 16. Last, a retaining ring 174 is mounted to the upper end of the tube 15 to prevent element 17 from being removed. The retaining ring 174 is provided with an inner slot 1741 corresponds to the vertical slot 151 of the tube 15. By this arrangement, when maintenance work is necessary, the retaining ring 174 can be loosed first, then rotated a certain angle in such a manner that the inner slot 1741 is in alignment with the vertical slot 151, then the inner tube 17 can be pulled out. By this arrangement, the lower compressed spring 155 is positioned to the bottom of the head tube 110 and the lower portion of the retaining body 16. Meanwhile, the upper compressed spring 154 is disposed between the position between the retaining body 16 and the biasing tube 173. Accordingly, the central rod 18 is ready to be moved upwardly or downward, as shown in FIGS. 7 and 9. If a downward force is applied, the central rod 18 can move the inner tube 17 downward. Then by rotating the handlebar 182 of the central rod 18, the inner tube 17 is rotated in such a manner that the post 171 is retained within the horizontal slot 152, as shown in FIGS. 8 and 10. A reverse operation makes the central post 18 jump upwardly automatically.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, by only by the appended claims.

I claim:

1. A folding bicycle comprising:
a front frame having a coupling tube and a head tube and a pair of parallel supporting tubes connecting the coupling tube and the head tube;
a front fork member being rotatably installed within said head tube and connected to a stem of a handlebar;
a front wheel being rotatably engaged on a fork tip of the fork member;
a rear frame member having a coupling shaft;
a seat post mounted on an upper end of said coupling shaft;
a seat engaged on the seat post;
a horizontal supporting tube having a first end engaged to a lower end of said coupling shaft;
an inclined supporting tube having a first end connected to said seat post;
a rear wheel rotatably engaged on a second end of said horizontal supporting tube and a second end of said inclined supporting tube;
the coupling tube having an upper end, a lower end and an outer wall;
a through hole in the outer wall of the coupling tube;
a flange member on the upper end of the coupling tube;
said flange member having a contoured portion and a sloped portion adjacent to the contoured portion;
the outer wall of the coupling tube having a slit at the upper end;
a pair of lug members with each having a threaded hole disposed at both sides of the slit;
an adjusting handle rotatably mounted in each of said threaded hole of the lug members to adjust an inner diameter of the coupling tube at the upper end;
the coupling shaft having an upper end, a lower end, and an outer wall portion;
an outer diameter of the coupling shaft being smaller than the inner diameter of the coupling tube to permit sliding and rotational engagement of the coupling shaft within the coupling tube;
a positioning hole extending through the outer wall of the coupling shaft;
a collar disposed at the upper end of the coupling shaft, the collar having a contoured portion and a sloped portion adjacent to the contoured portion corresponding to the contoured portion and the sloped portion of the flange of said coupling tube;
a spring member located within the outer wall of having a boss projecting through said positioning hole;
wherein, when said coupling shaft is engaged within said coupling tube with said folding bicycle in a folded position, said front frame and said rear frame can be rotated into a common plane,
wherein said boss is urged into said through hole by said spring means when said contoured portion and said sloped portion of said flange member are in corresponding engagement with said contoured portion and said sloped portion of said collar on said coupling shaft and
wherein said adjusting handle is rotated to tighten engagement between said coupling tube and said coupling shaft to stabilize said front frame and said rear frame in said common plane to permit use of said folding bicycle by a rider.

2. A folding bicycle as recited in claim 1, wherein a telescopic mechanism is engaged in the head tube, the head tube having a hollow central portion and a threaded portion at a top portion, a first washer, a collar and a second washer being mounted to the threaded portion, an upper tube having an inner threaded portion threaded to the threaded portion of the head tube, a vertical slot and a horizontal slot adjacent to the vertical slot formed in an inner wall of the upper tube, a lower compressed spring, a retaining body having a projected portion and an upper compressed spring being inserted into the hollow central portion of the head tube and the upper tube, an inner tube having a post projecting into the vertical slot and the horizontal slot when inserted into the hollow central portion and the upper tube, the inner tube further includes an acute end corresponding to the projected portion of the retaining body, a central rod having a threaded lower end portion being inserted into the inner tube and engaging a threaded portion of the retaining body, and a retaining ring being mounted to an upper end of the upper tube to prevent the elements from being removed, the retaining ring being provided with a pair of inner slots corresponding to the vertical slot of the tube.

* * * * *